US008983557B1

(12) United States Patent
Sun et al.

(10) Patent No.: US 8,983,557 B1
(45) Date of Patent: Mar. 17, 2015

(54) REDUCING POWER CONSUMPTION OF A MULTI-ANTENNA TRANSCEIVER

(75) Inventors: Yakun Sun, Sunnyvale, CA (US); Hui-Ling Lou, Sunnyvale, CA (US); Vladan Petrovic, San Jose, CA (US)

(73) Assignee: Marvell International Ltd., Hamilton (BM)

(*) Notice: Subject to any disclaimer, the term of this patent is extended or adjusted under 35 U.S.C. 154(b) by 181 days.

(21) Appl. No.: 13/536,506

(22) Filed: Jun. 28, 2012

Related U.S. Application Data (60) Provisional application No. 61/503,056, filed on Jun. 30, 2011.

(51) Int. Cl.
*H04M 1/00* (2006.01)
*H04B 1/38* (2006.01)

(52) U.S. Cl.
USPC ............................ 455/574; 455/41.2; 455/522

(58) Field of Classification Search
USPC ................................. 455/41.1, 41.2, 574, 522
See application file for complete search history.

(56) References Cited

U.S. PATENT DOCUMENTS

| | | | |
|---|---|---|---|
| 4,337,463 A | 6/1982 | Vangen | |
| 4,805,215 A | 2/1989 | Miller | |
| 5,347,234 A | 9/1994 | Gersbach et al. | |
| 5,634,207 A | 5/1997 | Yamaji et al. | |
| 5,673,291 A | 9/1997 | Dent | |
| 5,708,656 A | 1/1998 | Noneman et al. | |
| 5,847,616 A | 12/1998 | Ng et al. | |
| 5,995,819 A | 11/1999 | Yamaji et al. | |
| 6,167,245 A | 12/2000 | Welland et al. | |
| 6,285,262 B1 | 9/2001 | Kuriyama | |
| 6,320,919 B1 | 11/2001 | Khayrallah et al. | |
| 6,347,091 B1 | 2/2002 | Wallentin et al. | |
| 6,366,622 B1 | 4/2002 | Brown et al. | |
| 6,374,117 B1 | 4/2002 | Denkert et al. | |
| 6,438,364 B1 | 8/2002 | Waite | |
| 6,452,458 B1 | 9/2002 | Tanimoto | |
| 6,509,777 B2 | 1/2003 | Razavi et al. | |
| 6,519,461 B1 | 2/2003 | Andersson et al. | |
| 6,535,037 B2 | 3/2003 | Maligeorgos | |

(Continued)

FOREIGN PATENT DOCUMENTS

| | | |
|---|---|---|
| CN | 102067689 | 5/2011 |
| EP | 1860827 | 11/2007 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.

(Continued)

*Primary Examiner* — Tuan H Nguyen (57) ABSTRACT

The present disclosure describes techniques and apparatuses for reducing power consumption of a multi-antenna transceiver. In some aspects, the techniques and apparatuses minimize power consumption while maintaining a threshold level of performance, maximize performance while maintaining a threshold power-consumption limit, or optimize power consumption and performance. To do so, the techniques and apparatuses use a subset of the transceiver's available antennas, RF chains, and/or baseband receive chains.

18 Claims, 7 Drawing Sheets

(56) References Cited

U.S. PATENT DOCUMENTS

| | | |
|---|---|---|
| 6,553,229 B1 | 4/2003 | Dent |
| 6,640,308 B1 | 10/2003 | Keyghobad et al. |
| 6,650,195 B1 | 11/2003 | Brunn et al. |
| 6,675,328 B1 | 1/2004 | Krishnamachari et al. |
| 6,738,358 B2 | 5/2004 | Bist et al. |
| 6,741,846 B1 | 5/2004 | Welland et al. |
| 6,741,862 B2 | 5/2004 | Chung et al. |
| 6,754,189 B1 | 6/2004 | Cloutier et al. |
| 6,816,452 B1 | 11/2004 | Maehata |
| 6,816,718 B2 | 11/2004 | Yan et al. |
| 6,922,433 B2 * | 7/2005 | Tamura ......................... 375/148 |
| 6,934,566 B2 | 8/2005 | Kang et al. |
| 6,946,950 B1 | 9/2005 | Ueno et al. |
| 6,954,708 B2 | 10/2005 | Rakshani et al. |
| 7,079,811 B2 | 7/2006 | Lee et al. |
| 7,139,540 B2 | 11/2006 | Wu et al. |
| 7,173,431 B1 | 2/2007 | Lo et al. |
| 7,206,840 B2 | 4/2007 | Choi et al. |
| 7,212,798 B1 | 5/2007 | Adams et al. |
| 7,239,882 B1 | 7/2007 | Cook |
| 7,257,095 B2 | 8/2007 | Liu |
| 7,286,009 B2 | 10/2007 | Andersen et al. |
| 7,298,183 B2 | 11/2007 | Mirzaei et al. |
| 7,310,023 B2 | 12/2007 | Cha et al. |
| 7,319,849 B2 | 1/2008 | Womac |
| 7,342,895 B2 | 3/2008 | Serpa et al. |
| 7,355,416 B1 | 4/2008 | Darshan |
| 7,377,441 B2 | 5/2008 | Wiklof et al. |
| 7,395,040 B2 | 7/2008 | Behzad |
| 7,403,018 B1 | 7/2008 | Lo et al. |
| 7,529,548 B2 | 5/2009 | Sebastian |
| 7,564,826 B2 | 7/2009 | Sherman et al. |
| 7,595,768 B2 | 9/2009 | Li et al. |
| 7,599,671 B2 | 10/2009 | Kopikare et al. |
| 7,616,935 B2 | 11/2009 | Fernandez-Corbaton et al. |
| 7,626,966 B1 | 12/2009 | Ruiter et al. |
| 7,627,025 B2 | 12/2009 | Wang et al. |
| 7,627,026 B2 | 12/2009 | Wang et al. |
| 7,636,388 B2 | 12/2009 | Wang et al. |
| 7,656,205 B2 | 2/2010 | Chen et al. |
| 7,659,003 B2 | 2/2010 | Aoki et al. |
| 7,672,645 B2 | 3/2010 | Kilpatrick et al. |
| 7,689,190 B2 | 3/2010 | Kerth et al. |
| 7,711,004 B2 | 5/2010 | Xu |
| 7,717,342 B2 | 5/2010 | Wang |
| 7,734,253 B2 | 6/2010 | Chen et al. |
| 7,826,411 B2 | 11/2010 | Gonikberg et al. |
| 7,849,333 B2 | 12/2010 | Schindler |
| 7,876,786 B2 | 1/2011 | Bahl et al. |
| 7,881,746 B2 | 2/2011 | Desai |
| 7,898,948 B2 | 3/2011 | DiGirolamo et al. |
| 7,936,714 B1 | 5/2011 | Karr et al. |
| 7,957,340 B2 | 6/2011 | Choi et al. |
| 7,966,036 B2 | 6/2011 | Kojima |
| 7,995,544 B2 | 8/2011 | Benveniste |
| 8,000,715 B2 | 8/2011 | Melpignano et al. |
| 8,014,329 B2 | 9/2011 | Gong |
| 8,045,922 B2 | 10/2011 | Sherman et al. |
| 8,060,017 B2 | 11/2011 | Schlicht et al. |
| 8,072,913 B2 | 12/2011 | Desai |
| 8,077,652 B2 | 12/2011 | Thesling |
| 8,078,111 B2 | 12/2011 | Jovicic et al. |
| 8,081,038 B2 | 12/2011 | Lee et al. |
| 8,107,391 B2 | 1/2012 | Wu et al. |
| 8,126,502 B2 | 2/2012 | Trainin |
| 8,139,670 B1 | 3/2012 | Son et al. |
| 8,140,075 B2 | 3/2012 | Watanabe |
| 8,149,715 B1 | 4/2012 | Goel |
| 8,150,328 B2 | 4/2012 | Chaudhri et al. |
| 8,159,928 B2 | 4/2012 | Gorokhov et al. |
| 8,165,102 B1 | 4/2012 | Vleugels et al. |
| 8,170,002 B2 | 5/2012 | Wentink |
| 8,170,546 B2 | 5/2012 | Bennett |
| 8,189,506 B2 | 5/2012 | Kneckt et al. |
| 8,204,015 B2 | 6/2012 | Chaudhri et al. |
| 8,229,087 B2 | 7/2012 | Sumioka et al. |
| 8,254,296 B1 | 8/2012 | Lambert |
| 8,256,681 B2 | 9/2012 | Wang |
| 8,274,894 B2 | 9/2012 | Kneckt et al. |
| 8,275,314 B1 | 9/2012 | Lin |
| 8,310,967 B1 | 11/2012 | Goel |
| 8,315,564 B2 | 11/2012 | Banerjea |
| 8,340,034 B1 | 12/2012 | Lee |
| 8,364,188 B2 | 1/2013 | Srinivasan et al. |
| 8,369,782 B1 | 2/2013 | Lin et al. |
| 8,472,427 B1 | 6/2013 | Wheeler et al. |
| 8,472,968 B1 | 6/2013 | Kim |
| 8,493,992 B2 | 7/2013 | Sella et al. |
| 8,496,181 B2 | 7/2013 | Wang |
| 8,526,348 B2 | 9/2013 | Desai |
| 8,532,041 B1 | 9/2013 | Lambert et al. |
| 8,553,561 B1 | 10/2013 | Chokshi et al. |
| 8,571,479 B2 | 10/2013 | Banerjea |
| 8,577,305 B1 | 11/2013 | Rossi et al. |
| 8,588,705 B1 | 11/2013 | Tsui et al. |
| 8,599,814 B1 | 12/2013 | Vleugels et al. |
| 8,600,324 B1 | 12/2013 | Cousinard et al. |
| 8,626,067 B2 | 1/2014 | Ko et al. |
| 8,649,734 B1 | 2/2014 | Lin et al. |
| 8,655,278 B2 | 2/2014 | Laroche et al. |
| 8,655,279 B2 | 2/2014 | Banerjea |
| 8,665,848 B2 | 3/2014 | Wentink |
| 8,897,706 B1 | 11/2014 | Lin et al. |
| 8,923,788 B1 | 12/2014 | Cousinard et al. |
| 2002/0025810 A1 | 2/2002 | Takayama et al. |
| 2002/0049854 A1 | 4/2002 | Cox et al. |
| 2002/0102941 A1 | 8/2002 | Kuiri et al. |
| 2003/0040316 A1 | 2/2003 | Stanforth et al. |
| 2003/0148750 A1 | 8/2003 | Yan et al. |
| 2003/0198200 A1 | 10/2003 | Diener et al. |
| 2004/0044489 A1 | 3/2004 | Jones et al. |
| 2004/0063403 A1 | 4/2004 | Durrant |
| 2004/0105401 A1 | 6/2004 | Lee |
| 2004/0110470 A1 | 6/2004 | Tsien et al. |
| 2004/0162106 A1 | 8/2004 | Monroe et al. |
| 2004/0192222 A1 | 9/2004 | Vaisanen et al. |
| 2004/0198297 A1 | 10/2004 | Oh et al. |
| 2004/0214575 A1 | 10/2004 | Jovanovic |
| 2004/0233881 A1 | 11/2004 | Kang et al. |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0038876 A1 | 2/2005 | Chaudhuri |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0206554 A1 | 9/2005 | Yamaura |
| 2005/0215197 A1 | 9/2005 | Chen et al. |
| 2005/0250528 A1 | 11/2005 | Song et al. |
| 2005/0254423 A1 | 11/2005 | Berghoff |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1 | 6/2006 | Hwang et al. |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1 | 9/2006 | Ammirata |
| 2006/0200862 A1 | 9/2006 | Olson et al. |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |

(56) References Cited

U.S. PATENT DOCUMENTS

| | | |
|---|---|---|
| 2006/0281404 A1 | 12/2006 | Lee et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0026810 A1 | 2/2007 | Love et al. |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0264959 A1 | 11/2007 | Carrez |
| 2007/0268862 A1 | 11/2007 | Singh et al. |
| 2007/0280471 A1 | 12/2007 | Fallahi et al. |
| 2007/0286298 A1 | 12/2007 | Choi et al. |
| 2007/0297388 A1 | 12/2007 | Appaji et al. |
| 2008/0022162 A1 | 1/2008 | Qiu |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1 | 4/2008 | Chung |
| 2008/0095058 A1 | 4/2008 | Dalmases et al. |
| 2008/0095059 A1 | 4/2008 | Chu |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279163 A1 | 11/2008 | Desai |
| 2008/0280638 A1 | 11/2008 | Malladi et al. |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0067396 A1 | 3/2009 | Fischer |
| 2009/0137206 A1 | 5/2009 | Sherman et al. |
| 2009/0143043 A1 | 6/2009 | Yoshizaki et al. |
| 2009/0168686 A1 | 7/2009 | Love et al. |
| 2009/0168725 A1 | 7/2009 | Mishra |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0202013 A1 | 8/2009 | Sebastian |
| 2009/0209288 A1 | 8/2009 | Rofougaran |
| 2009/0239471 A1 | 9/2009 | Tran et al. |
| 2009/0240998 A1 | 9/2009 | Nikkila et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0268652 A1 | 10/2009 | Kneckt et al. |
| 2009/0275299 A1 | 11/2009 | Buch et al. |
| 2009/0280762 A1 | 11/2009 | Park et al. |
| 2009/0285264 A1 | 11/2009 | Aldana et al. |
| 2009/0291640 A1 | 11/2009 | Bhattad et al. |
| 2009/0291690 A1 | 11/2009 | Guvenc et al. |
| 2009/0311961 A1 | 12/2009 | Banerjea |
| 2009/0312027 A1 | 12/2009 | Foschini et al. |
| 2009/0321056 A1 | 12/2009 | Ran et al. |
| 2009/0325591 A1 | 12/2009 | Liu et al. |
| 2010/0009675 A1 | 1/2010 | Wijting et al. |
| 2010/0011231 A1 | 1/2010 | Banerjea et al. |
| 2010/0029325 A1 | 2/2010 | Wang et al. |
| 2010/0052796 A1 | 3/2010 | Menkhoff |
| 2010/0061244 A1 | 3/2010 | Meier et al. |
| 2010/0062799 A1 | 3/2010 | Ishii et al. |
| 2010/0069112 A1 | 3/2010 | Sun et al. |
| 2010/0080319 A1 | 4/2010 | Blocher et al. |
| 2010/0082957 A1 | 4/2010 | Iwata |
| 2010/0097952 A1 | 4/2010 | McHenry et al. |
| 2010/0103867 A1 | 4/2010 | Kishiyama et al. |
| 2010/0130129 A1 | 5/2010 | Chang et al. |
| 2010/0135256 A1 | 6/2010 | Lee et al. |
| 2010/0138549 A1 | 6/2010 | Goel et al. |
| 2010/0165896 A1 | 7/2010 | Gong et al. |
| 2010/0189165 A1 | 7/2010 | Xu et al. |
| 2010/0216497 A1 | 8/2010 | Kawasaki |
| 2010/0238793 A1 | 9/2010 | Alfano et al. |
| 2010/0248734 A1 | 9/2010 | Yamazaki et al. |
| 2010/0283654 A1 | 11/2010 | Waheed et al. |
| 2010/0284355 A1 | 11/2010 | Jung et al. |
| 2010/0293293 A1 | 11/2010 | Beser |
| 2010/0303026 A1 | 12/2010 | Chaudhri et al. |
| 2010/0316027 A1 | 12/2010 | Rick et al. |
| 2010/0322213 A1 | 12/2010 | Liu et al. |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0021240 A1 | 1/2011 | Hiltunen et al. |
| 2011/0026488 A1 | 2/2011 | Patel et al. |
| 2011/0053522 A1 | 3/2011 | Rofougaran et al. |
| 2011/0097998 A1 | 4/2011 | Ko et al. |
| 2011/0103363 A1 | 5/2011 | Bennett |
| 2011/0161697 A1 | 6/2011 | Qi et al. |
| 2011/0164538 A1 | 7/2011 | Karr et al. |
| 2011/0188391 A1 | 8/2011 | Sella et al. |
| 2011/0194519 A1 | 8/2011 | Habetha |
| 2011/0205924 A1 | 8/2011 | Gonikberg et al. |
| 2011/0274040 A1 | 11/2011 | Pani et al. |
| 2012/0020319 A1 | 1/2012 | Song et al. |
| 2012/0025921 A1 | 2/2012 | Yang et al. |
| 2012/0087341 A1 | 4/2012 | Jang et al. |
| 2012/0099476 A1 | 4/2012 | Mahaffy |
| 2012/0115420 A1 | 5/2012 | Trainin |
| 2012/0195397 A1 | 8/2012 | Sayana et al. |
| 2012/0213162 A1 | 8/2012 | Koo et al. |
| 2012/0213208 A1 | 8/2012 | Hsu et al. |
| 2012/0244805 A1* | 9/2012 | Haikonen et al. ............ 455/41.2 |
| 2012/0276938 A1 | 11/2012 | Wagholikar et al. |
| 2012/0294396 A1 | 11/2012 | Desai |
| 2012/0327779 A1 | 12/2012 | Gell et al. |
| 2013/0045687 A1 | 2/2013 | Banerjea |
| 2013/0045688 A1 | 2/2013 | Banerjea |
| 2013/0057344 A1 | 3/2013 | Touzard et al. |
| 2013/0114548 A1 | 5/2013 | Banerjea |
| 2013/0130684 A1 | 5/2013 | Gomes et al. |
| 2013/0176903 A1 | 7/2013 | Bijwe |
| 2013/0217401 A1 | 8/2013 | Edge et al. |
| 2013/0225068 A1 | 8/2013 | Kiminki et al. |
| 2013/0287043 A1 | 10/2013 | Nanda et al. |
| 2014/0003318 A1 | 1/2014 | Desai |
| 2014/0004794 A1 | 1/2014 | Contaldo |
| 2014/0043966 A1 | 2/2014 | Lee et al. |
| 2014/0044106 A1 | 2/2014 | Bhagwat |
| 2014/0073251 A1 | 3/2014 | Banerjea |

(56) References Cited

U.S. PATENT DOCUMENTS

FOREIGN PATENT DOCUMENTS

| | | |
|---|---|---|
| EP | 2299642 | 3/2011 |
| EP | 2456275 | 5/2012 |
| JP | 2006174162 | 6/2006 |
| JP | 200728568 | 2/2007 |
| JP | 2007028568 | 2/2007 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008707777 | 6/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

Jung, et al.,"A Power Control MAC Protocol for Ad Hoc Networks", Wireless Networks ; The Journal of Mobile Communication, Computation and Information, Kluwer Academic Publishers vol. 11, No. 1-2, Jan. 1, 2005, 12 Pages.

Jung, et al.,"A Power Control MAC Protocol for Ad Hoc Networks", In Proceedings of MOBICOM 2002, Sep. 23, 2002, pp. 36-47.

"Advisory Action", U.S. Appl. No. 12/646,721, Aug. 13, 2013, 3 pages.

"Advisory Action", U.S. Appl. No. 12/190,251, Dec. 7, 2011, 3 pages.

Mazzanti, et al.,"Analysis and Design of Injection-Locked LC Dividers for Quadrature Generation", IEEE Journal of Solid-State Circuits, vol. 39, No. 9, Sep. 2004, pp. 1425-1433.

"Draft Standard for Information Technology—Telecommunications and information exchange between systems—Local and metropolitan area networks—Specific requirements", IEEE P802.11s/D1.03, Apr. 2007, 251 pages.

"Final Office Action", U.S. Appl. No. 12/759,336, Feb. 25, 2013, 11 pages.

"Final Office Action", U.S. Appl. No. 12/358,955, Mar. 18, 2013, 12 pages.

"Final Office Action", U.S. Appl. No. 12/534,361, Feb. 29, 2012, 13 pages.

"Final Office Action", U.S. Appl. No. 12/646,802, Nov. 15, 2012, 15 pages.

"Final Office Action", U.S. Appl. No. 12/190,251, Sep. 13, 2011, 15 pages.

"Final Office Action", U.S. Appl. No. 12/646,721, Jun. 6, 2013, 16 pages.

"Final Office Action", U.S. Appl. No. 12/484,563, Apr. 24, 2012, 18 pages.

"Final Office Action", U.S. Appl. No. 12/616,454, Apr. 11, 2012, 19 pages.

"Final Office Action", U.S. Appl. No. 12/186,429, Oct. 13, 2011, 23 pages.

"Final Office Action", U.S. Appl. No. 12/542,845, Sep. 25, 2012, 23 pages.

"Final Office Action", U.S. Appl. No. 12/358,955, Feb. 17, 2012, 26 pages.

"Final Office Action", U.S. Appl. No. 12/323,292, Aug. 24, 2012, 26 pages.

"Final Office Action", U.S. Appl. No. 12/487,425, May 3, 2012, 9 pages.

"Foreign Office Action", Chinese Application No. 200980122587.0, Sep. 10, 2013, 11 Pages.

"Foreign Notice of Allowance", Japanese Application No. 2011-513586, Jul. 16, 2013, 2 pages.

"Foreign Office Action", Chinese Application No. 200980122587.0, Feb. 21, 2013, 17 pages.

"Foreign Office Action", European Patent Application No. 09789754.0, Mar. 11, 2013, 4 Pages.

"Foreign Office Action", Japanese Application No. 2011-513586, Apr. 9, 2013, 4 Pages.

"Foreign Office Action", European Patent Application No. 09789754.0, Jul. 12, 2012, 4 pages.

"Foreign Office Action", Japanese Application No. 2011-513586, Oct. 23, 2012, 7 pages.

"Foreign Office Action", EP Application No. 09789754.0, May 17, 2011, 8 pages.

"Further Higher Data Rate Extension in the 2.4 GHz Band", IEEE P802.11g/D8.2,DRAFT Supplement to STANDARD [for] Information Technology, Apr. 2003, 69 pages.

Haas et al.,"Gossip-Based Ad Hoc Routing", IEEE/ACM Transactions on Networking, vol. 14, No. 3, Jun. 2006, pp. 479-491.

"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.

"Information Technology—Telecommunications and Information Exchange Between systems—Local and Metropolitan Area Networks—Specific Requirements", IEEE Standard, Aug. 1, 2005, pp. 1-60.

"Information Technology—Telecommunications and Information Exchange between Systems—Local and Metropolitan Area Networks—Specific Requirements", Part 11: Wireless Lan Medium Access Control (MAC) and Physical Layer (PHY) Specifications, IEEE Standard 802.11h-2003 (Amendment to IEEE Std 802.11-1993), Oct. 14, 2003, 80 pages.

Qiao, et al.,"Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.

"International Search Report and Written Opinion", PCT Application PCT/US2012/035597, Aug. 6, 2012, 13 pages.

"Non-Final Office Action", U.S. Appl. No. 12/167,841, Jul. 15, 2011, 10 pages.

"Non-Final Office Action", U.S. Appl. No. 12/534,361, Oct. 12, 2011, 11 pages.

"Non-Final Office Action", U.S. Appl. No. 12/190,251, Mar. 29, 2012, 11 pages.

"Non-Final Office Action", U.S. Appl. No. 13/099,169, Mar. 28, 2013, 12 pages.

"Non-Final Office Action", U.S. Appl. No. 13/429,090, Oct. 24, 2013, 13 pages.

"Non-Final Office Action", U.S. Appl. No. 12/484,563, Oct. 4, 2011, 13 pages.

"Non-Final Office Action", U.S. Appl. No. 12/759,336, Oct. 4, 2012, 13 pages.

"Non-Final Office Action", U.S. Appl. No. 12/732,036, Aug. 9, 2012, 13 pages.

"Non-Final Office Action", U.S. Appl. No. 13/479,124, Sep. 27, 2013, 14 pages.

"Non-Final Office Action", U.S. Appl. No. 12/646,721, Nov. 7, 2012, 15 pages.

"Non-Final Office Action", U.S. Appl. No. 12/646,721, May 10, 2012, 15 pages.

"Non-Final Office Action", U.S. Appl. No. 12/235,333, Jun. 28, 2011, 16 pages.

"Non-Final Office Action", U.S. Appl. No. 12/646,802, Mar. 29, 2012, 16 pages.

"Non-Final Office Action", U.S. Appl. No. 12/323,292, Dec. 21, 2011, 17 pages.

"Non-Final Office Action", U.S. Appl. No. 12/478,446, Dec. 28, 2011, 17 pages.

"Non-Final Office Action", U.S. Appl. No. 12/883,054, Nov. 22, 2013, 18 pages.

"Non-Final Office Action", U.S. Appl. No. 13/656,482, Mar. 19, 2013, 19 pages.

(56) References Cited

OTHER PUBLICATIONS

"Non-Final Office Action", U.S. Appl. No. 12/186,429, Apr. 25, 2011, 19 pages.
"Non-Final Office Action", U.S. Appl. No. 12/542,845, Apr. 4, 2012, 19 pages.
"Non-Final Office Action", U.S. Appl. No. 12/358,955, Sep. 6, 2011, 24 pages.
"Non-Final Office Action", U.S. Appl. No. 12/542,845, Oct. 23, 2013, 29 pages.
"Non-Final Office Action", U.S. Appl. No. 12/358,955, Aug. 20, 2012, 33 pages.
"Non-Final Office Action", U.S. Appl. No. 13/656,502, Feb. 21, 2013, 6 pages.
"Non-Final Office Action", U.S. Appl. No. 13/604,563, Apr. 5, 2013, 6 pages.
"Non-Final Office Action", U.S. Appl. No. 12/487,425, Jan. 12, 2012, 7 pages.
"Non-Final Office Action", U.S. Appl. No. 12/190,240, Jan. 6, 2012, 7 pages.
"Non-Final Office Action", U.S. Appl. No. 12/616,454, Dec. 22, 2011, 8 pages.
"Non-Final Office Action", U.S. Appl. No. 12/190,251, Mar. 29, 2011, 8 pages.
"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/099,169, Oct. 4, 2013, 9 pages.
"Notice of Allowance", U.S. Appl. No. 13/656,502, Jun. 25, 2013, 11 pages.
"Notice of Allowance", U.S. Appl. No. 12/167,841, Nov. 25, 2011, 11 pages.
"Notice of Allowance", U.S. Appl. No. 12/534,361, Feb. 14, 2013, 12 pages.
"Notice of Allowance", U.S. Appl. No. 12/190,240, May 16, 2012, 4 pages.
"Notice of Allowance", U.S. Appl. No. 12/616,454, Aug. 22, 2012, 4 pages.
"Notice of Allowance", U.S. Appl. No. 12/235,333, Nov. 15, 2011, 5 pages.
"Notice of Allowance", U.S. Appl. No. 13/604,563, Sep. 26, 2013, 5 pages.
"Notice of Allowance", U.S. Appl. No. 12/190,251, Oct. 4, 2012, 6 pages.
"Notice of Allowance", U.S. Appl. No. 12/478,446, Jun. 14, 2012, 6 pages.
"Notice of Allowance", U.S. Appl. No. 12/484,563, Jul. 9, 2012, 6 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 12/323,292, Jun. 28, 2013, 8 pages.
"Notice of Allowance", U.S. Appl. No. 12/358,955, Jul. 1, 2013, 8 pages.
"Notice of Allowance", U.S. Appl. No. 13/656,482, Sep. 3, 2013, 8 pages.
"Notice of Allowance", U.S. Appl. No. 12/759,336, May 3, 2013, 9 pages.
"Notice of Allowance", U.S. Appl. No. 12/186,429, Jun. 6, 2013, 9 pages.
"Notice of Allowance", U.S. Appl. No. 12/487,425, Jul. 26, 2013, 9 pages.
"Part 11: Wireless LAN Medium Access Control (MAC) and Physical Layer (PHY) specifications", IEEE Std 802.11b-1999/Cor 1-2001,Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999,High-speed Physical Layer in the 5 GHz Band, 1999, 91 pages.
"Part 11: Wireless LAN Medium Access Control (MAC) and Physical Layer (PHY) specifications", Information technology—Telecommunications and information exchange between system—Local and metropolitan area networks—Specific requirements—,IEEE, Apr. 2003, pp. 1-69.
"PCT Search Report", Application No. PCT/US2009/046289, Oct. 29, 2009, 13 pages.
"PCT Search Report and Written Opinion", Application No. PCT/US2013/025144, Jun. 5, 2013, 10 pages.
"PCT Search Report and Written Opinion", Application No. PCT/US2011/054358, Dec. 16, 2011, 13 pages.
"PCT Search Report and Written Opinion", Application No. PCT/IB2013/000390, Aug. 21, 2013, 19 Pages.
"Restriction Requirement", U.S. Appl. No. 12/167,841, May 12, 2011, 6 pages.
Tinnirello, et al.,"Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.
"Search Report", European Application No. 13169350.9, Aug. 13, 2013, 10 Pages.
"Supplemental Notice of Allowance", U.S. Appl. No. 12/759,336, Jun. 5, 2013, 2 pages.
"Supplemental Notice of Allowance", U.S. Appl. No. 12/759,336, Jun. 18, 2013, 2 pages.
"Supplemental Notice of Allowance", U.S. Appl. No. 12/186,429, Jul. 10, 2013, 2 pages.
"Supplemental Notice of Allowance", U.S. Appl. No. 12/759,336, Aug. 14, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 12/716,569, Jul. 23, 2012, 2 pages.
"Supplemental Notice of Allowance", U.S. Appl. No. 12/358,955, Oct. 11, 2013, 3 pages.
Mujtaba, "TGn Sync Proposal Technical Specification", IEEE 802.11-04/0889r6,This document presents the technical specification for the MAC and the PHY layer of the TGn Sync proposal to IEEE 802.11 TGn, May 18, 2005, pp. 1-131.
Mujtaba "TGn Sync Proposal Technical Specification", IEEE 802.11-04 / Wireless LANs, May 2005, pp. 1-131.
"Non-Final Office Action", U.S. Appl. No. 13/911,979, Jan. 31, 2014, 19 pages.
"Supplemental Notice of Allowance", U.S. Appl. No. 13/656,482, Nov. 29, 2013, 2 pages.
"Supplemental Notice of Allowance", U.S. Appl. No. 13/656,482, Dec. 19, 2013, 2 pages.
"Non-Final Office Action", U.S. Appl. No. 13/757,276, Jan. 30, 2014, 9 pages.
"Final Office Action", U.S. Appl. No. 12/883,054, Jun. 9, 2014, 22 pages.
"International Search Report and Written Opinion", Application No. PCT/IB2013/001962, Feb. 6, 2014, 11 Pages.
"Non-Final Office Action", U.S. Appl. No. 13/458,227, Jul. 3, 2014, 10 pages.
"Non-Final Office Action", U.S. Appl. No. 13/911,979, Jun. 9, 2014, 11 pages.
"Non-Final Office Action", U.S. Appl. No. 14/082,981, Aug. 4, 2014, 6 pages.
"Non-Final Office Action", U.S. Appl. No. 14/089,515, May 13, 2014, 9 pages.

(56) References Cited

OTHER PUBLICATIONS

"Notice of Allowance", U.S. Appl. No. 13/757,276, Jul. 8, 2014, 6 pages.
"Notice of Allowance", U.S. Appl. No. 14/089,515, Aug. 21, 2014, 4 pages.
"Non-Final Office Action", U.S. Appl. No. 12/883,054, filed Sep. 11, 2014, 29 pages.
"Non-Final Office Action", U.S. Appl. No. 13/622,916, filed Sep. 10, 2014, 10 pages.
"Non-Final Office Action", U.S. Appl. No. 14/063,972, filed Sep. 24, 2014, 6 pages.
"Notice of Allowance", U.S. Appl. No. 13/911,979, filed Nov. 20, 2014, 12 pages.
"Notice of Allowance", U.S. Appl. No. 14/063,972, filed Nov. 7, 2014, 8 pages.
"Supplemental Notice of Allowance", U.S. Appl. No. 13/757,276, filed Oct. 24, 2014, 2 pages.

* cited by examiner

REDUCING POWER CONSUMPTION OF A MULTI-ANTENNA TRANSCEIVER

RELATED APPLICATIONS

This present disclosure claims priority to U.S. Provisional Patent Application Ser. No. 61/503,056 filed Jun. 30, 2011, the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many conventional transceivers have multiple antennas, such as two transmit antennas and two receive antennas. These multi-antenna transceivers provide, in some cases, improved transmission and reception over transceivers having a single transmit or receive antenna. However, this improved transmission and reception typically comes at a cost of increased power consumption.

SUMMARY

This summary is provided to introduce subject matter that is further described below in the Detailed Description and Drawings. Accordingly, this Summary should not be considered to describe essential features nor used to limit the scope of the claimed subject matter.

In general, in one aspect, this specification describes a method for providing power to a plurality of components respectively associated with a plurality of receive paths. The method determines a first level of performance associated with each receive path of the plurality of receive paths. The method further determines, based on the first level of performance associated with each receive path of the plurality of receive paths and a minimum reception performance metric, whether use of a subset of the plurality of receive paths will meet or exceed the minimum reception performance metric. In response to determining that the use of the subset of the plurality of receive paths with meet or exceed the minimum reception performance metric, the method further includes ceasing to provide power to each component respectively associated with the plurality of receive paths other than the one or more plurality of components respectively associated with the subset of the plurality of receive paths effective to reduce an amount of power consumed by the receiver while meeting or exceeding the minimum reception performance metric.

In general, in another aspect, this specification describes a system that includes a receiver and a controller. The receiver has multiple receive paths, in which each of the receive paths respectively has an antenna. The controller is configured to determine, based on a current level of performance of the receiver and a power-consumption budget, a subset of the multiple receive paths that will meet the power-consumption budget and have a highest reception performance. The controller is also configured to cease to power the antennas, as well as other components, of the multiple receive paths other than those of the subset of the multiple receive paths effective to meet the power-consumption budget.

Another method is described that transmits, to a receiving entity, signals using a single transmission path or multiple transmission paths of a transmitter of a transmitting entity and receiving, from the receiving entity, an indication that a minimum reception performance metric at the receiving entity is not being met or that the multiple transmission paths are not needed. If the minimum reception performance metric is not being met, the method powers one or more additional transmission paths of the transmitter and transmits, to the receiving entity, signals using the single transmission path or the multiple transmission paths and the one or more additional transmission paths. Alternatively, if the multiple transmission paths are not needed, the method ceases to power components of one or more of the multiple transmission paths.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Overview

Conventional multi-antenna transceivers use multiple transmit or receive antennas. These transceivers may use multiple antennas even if improved transmission or reception is not needed or even, in some cases, if using multiple transmit or receive antennas reduces performance. For example, when a reception rate of a receive antenna is sufficiently high to receive a signal, use of a second antenna for reception of that signal may not improve reception but will consume additional power. By way of another example, consider a case where two transmit antennas of a transceiver are transmitting with high spatial correlation sufficient to share much of a transmission bandwidth. In this case, use of the second transmit antenna adds little to transmission performance but consumes as much as twice the power of using one transmit antenna.

This document describes techniques and apparatuses for reducing power consumption of a multi-antenna transceiver. In some embodiments, the techniques and apparatuses minimize power consumption while maintaining a threshold level of performance, maximize performance while maintaining a threshold power-consumption limit, or optimize power consumption and performance. To do so, the techniques and apparatuses use a subset of the transceiver's available antennas, RF chains, and/or baseband receive chains.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
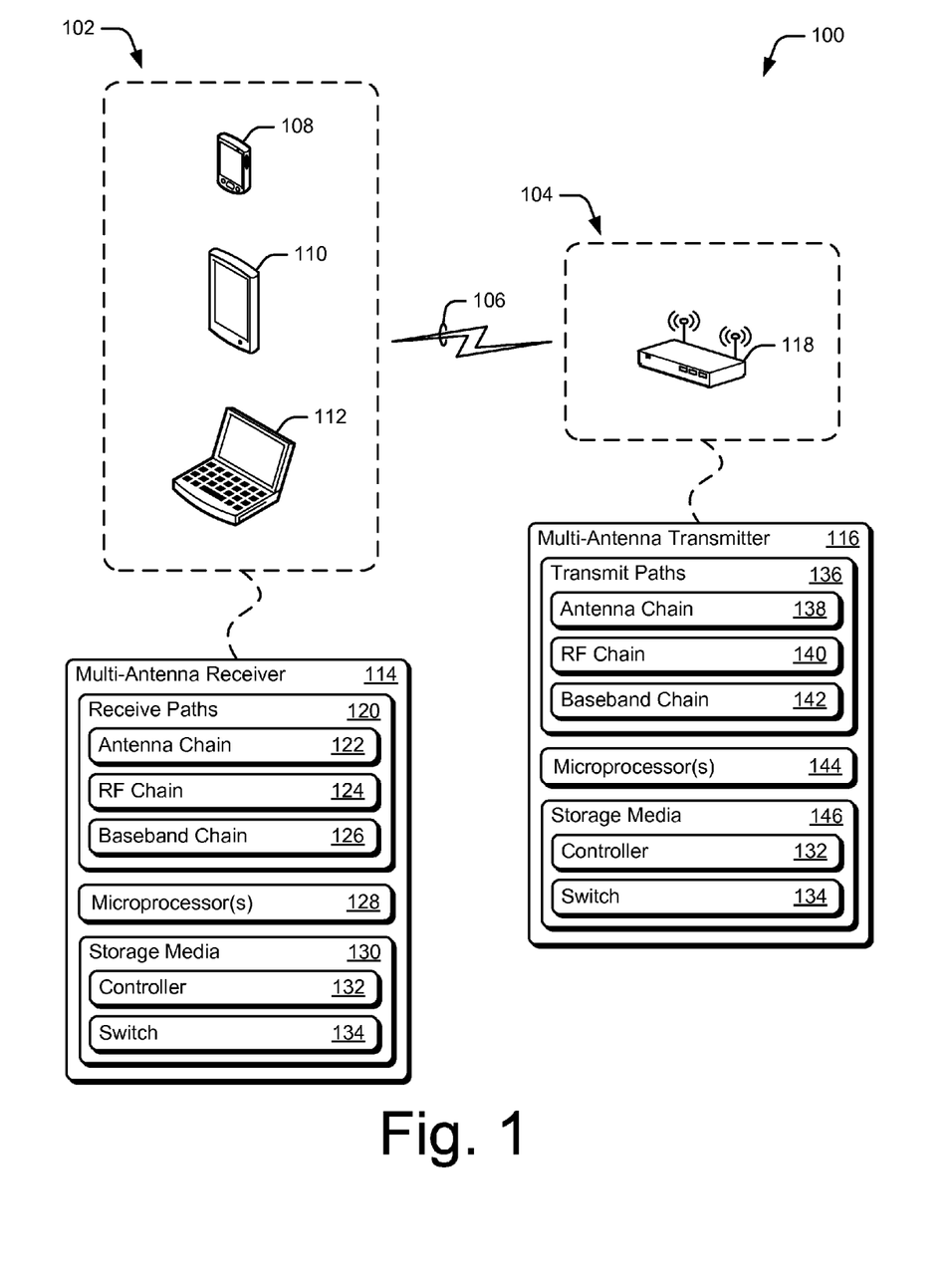
FIG. 1 illustrates an operating environment in which techniques for reducing power consumption of a multi-antenna transceiver may be implemented.

FIG. 1 illustrates an example operating environment 100 having wireless receiving devices 102 (receiving devices 102) and wireless transmitting device 104 (transmitting device 104), each of which are capable of communicating data, packets, and/or frames over a wireless connection 106, such as a wireless-local-area network (WLAN). It should be noted that these devices are illustrated as receiving or transmitting devices by way of example only, and each device is capable of both transmission and reception of wireless data via wireless connection 106. Thus, during the course of wireless communication, communicative roles of these respective devices may switch corresponding to the flow of data communicated between the devices. As such, in the description that follows, components or features of receiving device 102 are also shared by transmitting device 104 and vice-versa.

Receiving devices 102 include smart-phone 108, tablet computer 110, and laptop computer 112. Although not shown, other configurations of receiving devices 102 are also contemplated such as a desktop computer, server, mobile-internet device (MID), mobile gaming console, electronic readers or books (e-readers or e-books), internet protocol enabled televisions (IP TVs), and so on.

Each receiving device 102 includes a multi-antenna receiver 114 and/or a multi-antenna transmitter 116 for providing a wireless interface to handle various communication protocols, such as for example IEEE 802.11-2007, IEEE 802.11n, IEEE 802.11s, and the like. Each receiving device 102 is shown including multi-antenna receiver 114 (receiver 114) but may also or instead include multi-antenna transmitter 116 (transmitter 116), either separately or combined as a transceiver. Thus, while receiver 114 and transmitter 116 are shown separately, one for each of receiving devices 102 and transmitting device 104, they may be combined, such as in hardware combined with or separate from firmware or software.

Transmitting device 104 includes wireless access point 118 (access point 118). Other transmitting devices are contemplated herein, including various networking devices, such as routers, mobile hotspots, wireless repeaters, wireless devices configured to share a wireless connection, and so on. Transmitting device 104 may provide access to resources, services (e.g., capabilities or functions), the Internet, or other networks communicatively coupled with transmitting device 104. For example, tablet computer 110 is able to access the Internet when connected wirelessly to transmitting device 104. Note that while transmitting device 104 is shown including access point 118, it may instead be a wireless device, such as any of receiving devices 102.

Multi-antenna receiver 114 (receiver 114) includes two or more receive paths 120 having chains of one or more components that can be powered or unpowered, such as a receiver antenna chain 122 (antenna chain 122), a receiver radio frequency (RF) chain 124 (RF chain 124), and a receiver baseband chain 126 (baseband chain 126). These chains and their components are described in greater detail below.

Receiver 114 also includes micro-processors 128 and computer-readable storage media 130 (storage media 130). Storage media 130 may include any suitable memory or storage device such as static RAM (SRAM), ROM, or Flash memory useful to store data of applications or firmware. Storage media 130 includes controller 132 and switch 134. Micro-processors 128 are capable of executing computer-executable instructions of any of the entities of receiver 114, such as controller 132 and switch 134. Note that antenna chain 122, RF chain 124, and baseband chain 126 may also include executable instructions and be stored, in whole or in part, on storage media 130 and executable by micro-processors 128. All of these entities may also or instead be implemented in hardware.

Multi-antenna transmitter 116 (transmitter 116) includes two or more transmit paths 136 having chains of one or more components that can be powered or unpowered, such as a transmitter antenna chain 138 (antenna chain 138), a transmitter radio frequency (RF) chain 140 (RF chain 140), and a transmitter baseband chain 142 (baseband chain 142). These chains and their components may be the same, similar to, or different from those described for receiver 114. In some cases, for example, receiver 114 and transmitter 116 are embodied together as or part of a transceiver, in which case these chains may share components common to both receive chains and transmit chains.

Transmitter 116 includes micro-processors 144 and computer-readable storage media 146 (storage media 146). Storage media 146 may include any suitable memory or storage device such as static RAM (SRAM), ROM, or Flash memory useful to store data of applications. Storage media 146 includes controller 132 and switch 134. Micro-processors 144 are capable of executing computer-executable instructions of any of the entities of transmitter 116, such as controller 132 and switch 134. Note that antenna chain 138, RF chain 140, and baseband chain 142, may also include executable instructions and be stored, in whole or in part, on storage media 146 and executable by microprocessors 144. All of these entities may also or instead be implemented in hardware.

As noted in part above, receiver 114 and/or transmitter 116 may be embodied as or part of a transceiver, though this is not required. In such a case, the chains and controller 132 may operate differently, though the chains and controller 132 can be capable of operating in both scenarios. Furthermore, receiver 114, transmitter 116, or a transceiver having one or both of receiver 114 and transmitter 116, along with components thereof, may be embodied on a single System-on-Chip (SoC), in whole or in part.

Figure 2:
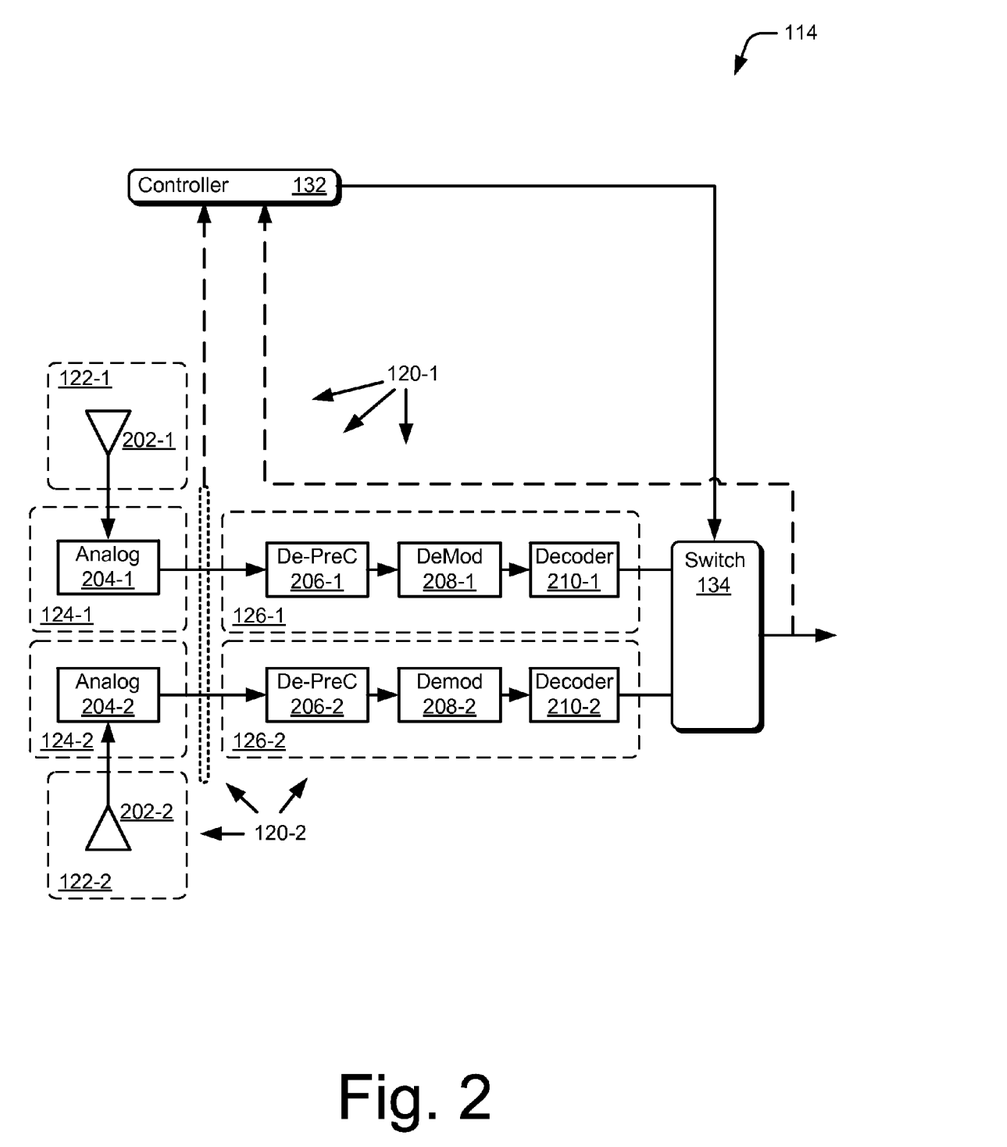
FIG. 2 illustrates an example of the receiver of FIG. 1, along with chains and components of receive paths that the techniques may selectively power.

By way of example, consider FIG. 2, which illustrates some of the chains and components thereof that the techniques may selectively power. FIG. 2 illustrates two example receive paths (receive path 120-1 and receive path 120-2) of receiver 114, in which the receive paths 120-1, 120-2 include examples of antenna chains 122-1, 122-2, radio frequency (RF) chains 124-1, 124-2, and baseband chains 126-1, 126-2, respectively. While not shown for visual brevity, antenna chains 122 may include components in addition to receive antennas 202-1, 202-2, such as low-noise amplifiers, filters, and the like. Likewise, radio-frequency chains 124 are shown including analog-to-digital converters 204-1, 204-2 (analogs 204), though other components may also be included (including linear de-precoders, for example). Baseband chains 126 include digital de-precoders 206-1, 206-2 (De-PreC 206), demodulators 208-1, 208-2 (demods 208), and decoders 210-1, 210-2, all respectively.

FIG. 2 also illustrates an example implementation of controller 132 and switch 134. In this example, controller 132 receives information about receive performance after processing of received signals by RF chains 124-1 and 124-2

(e.g., signal-to-noise ratios) and/or baseband chains 126-1 and 126-2. Controller 132 controls switch 134 effective to selectively power various components of receiver 114. As shown in this example, controller 132 can cause switch 134 to turn off the chains and their components of either receive path 120-1 or 120-2, in whole or in part. Note that chains and/or components thereof can be shared by antenna chains 122, such as two antennas for one RF chain, or two antennas and RF chains for one baseband chain, for example.

Figure 3:
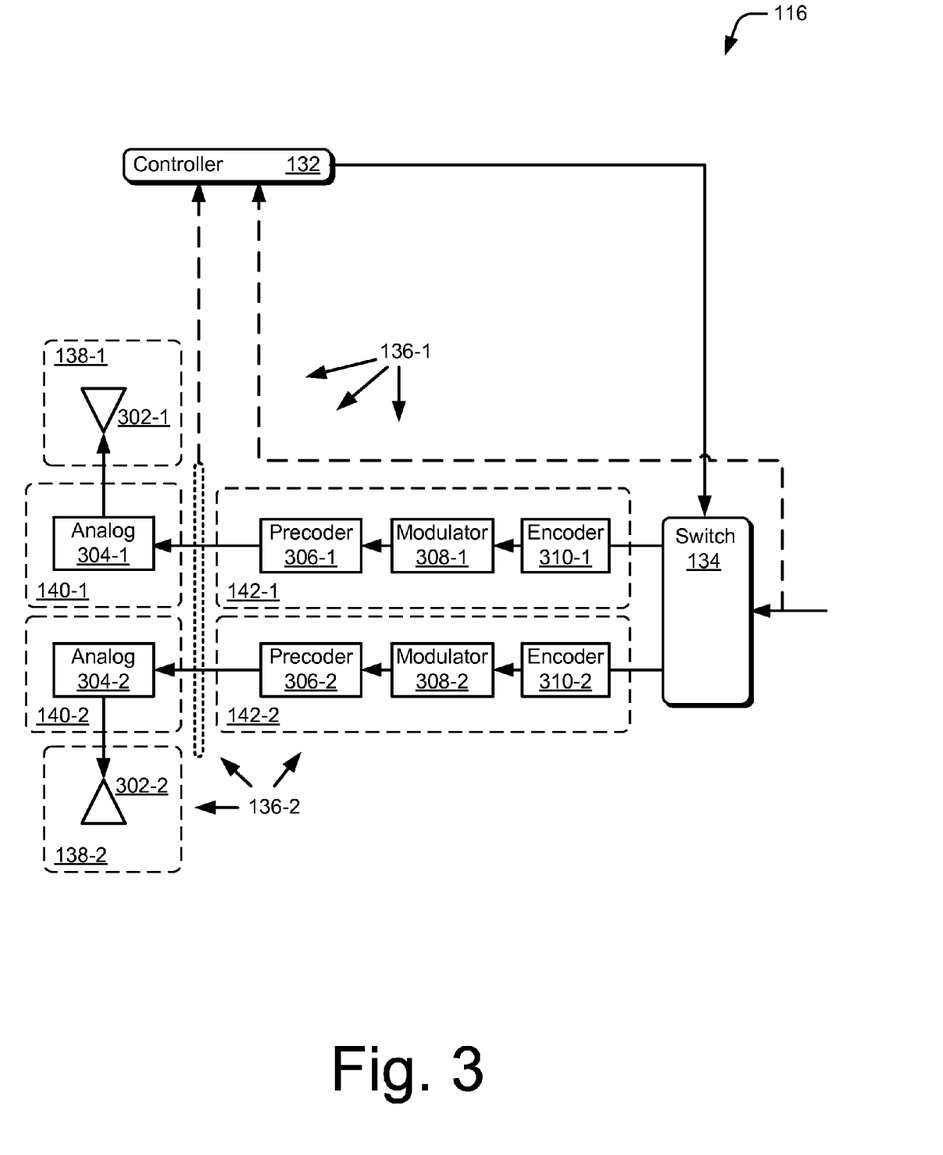
FIG. 3 illustrates an example of the transmitter of FIG. 1, along with chains and components of transmit paths that the techniques may selectively power.

FIG. 3 illustrates an example of transmitter 116 of FIG. 1, along with some of the chains and components thereof that the techniques may selectively power. FIG. 3 illustrates two example transmit paths 136-1 and 136-2, which includes examples of antenna chains 138-1, 138-2, transmit radio frequency (RF) chains 140-1, 140-2, and transmit baseband chains 142-1, 142-2, respectively. While not shown for visual brevity, transmit antenna chains 136 may include more than transmit antennas 302-1, 302-2, such as low-noise amplifiers, filters, and the like. Transmit radio-frequency chains 140 are shown including analog-to-digital converters 304-1, 304-2 (analogs 304), though other components may also be included. Transmit baseband chains 142 include digital precoders 306-1, 306-2 (precoders 306), modulators 308-1, 308-2, and encoders 310-1, 310-2, all respectively.

Ways in which entities of FIGS. 1, 2, and 3 act and interact are set forth in greater detail below. The entities illustrated can be separate or integrated to the extent permitted by the techniques described herein, such as controller 132 and switch 134 or components of various chains, for example. These entities are shown as computer-executable instructions executable by microprocessor(s) 128, 144, but may instead be hardware or firmware, or a combination of hardware, firmware, and/or software.

Reducing Power Consumption of a Multi-Antenna Transceiver

The following discussion describes techniques for reducing power consumption of a multi-antenna transceiver. These techniques can be implemented in the previously described environments and by entities thereof, such as controller 132 of FIGS. 1-3. These techniques include methods illustrated in FIGS. 4-6, each of which is shown as a set of operations performed by one or more entities. These methods are not necessarily limited to the orders shown for performing the operations. Further, these methods may be used in conjunction with one another, whether performed by the same entity, separate entities, or any combination thereof. In portions of the following discussion, reference will be made to operating environment 100 of FIG. 1 by way of example. Such reference is not to be taken as limited to operating environment 100 but rather as illustrative of one of a variety of examples.

Figure 4:
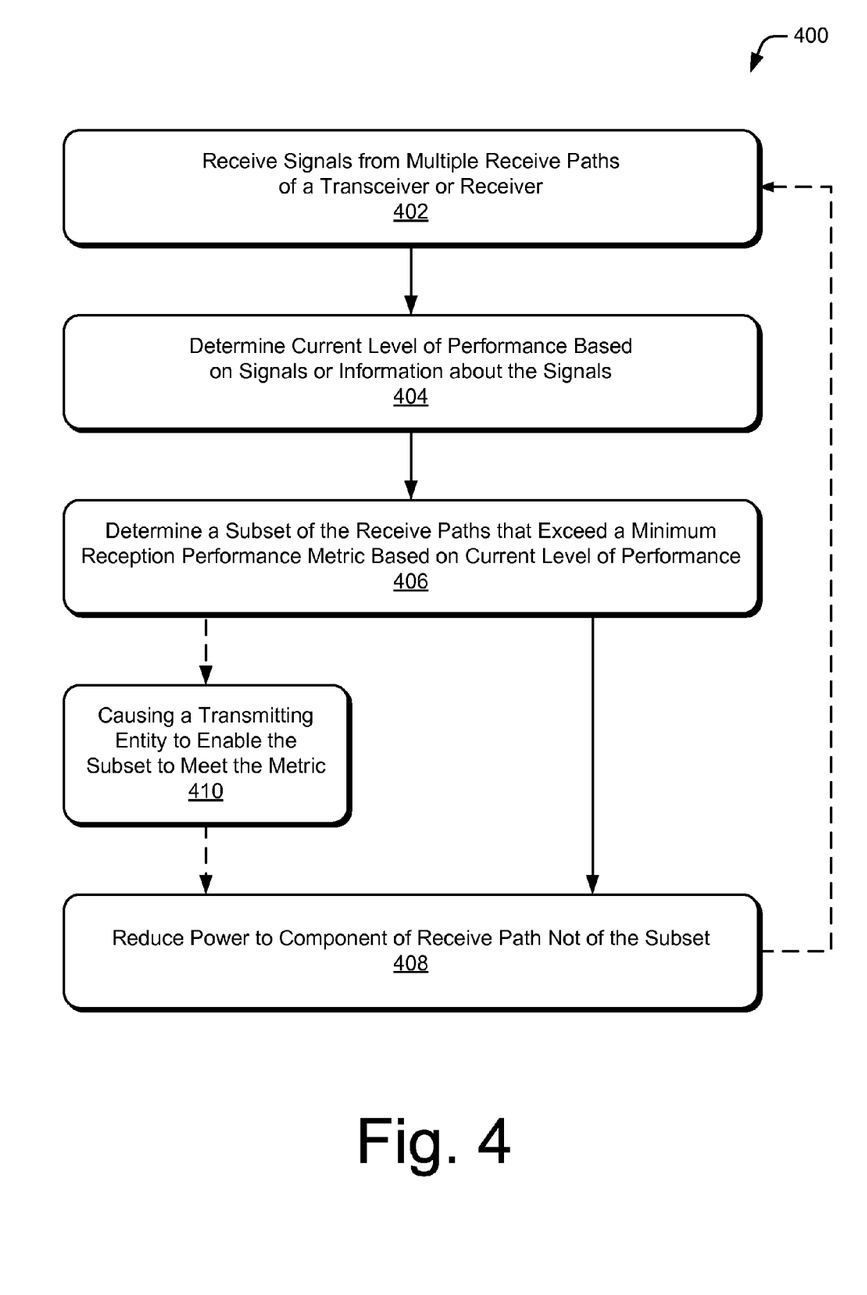
FIG. 4 illustrates a method for reducing power consumption of a multi-antenna receiver or transceiver.

FIG. 4 illustrates a method 400 for reducing power consumption of a multi-antenna receiver. At 402, signals are received from multiple receive paths of a receiver. As illustrated in FIG. 2, these signals may be received by multiple antennas through multiple receive paths, through a wireless medium, and from a transmitter. As described above, the multiple receive paths each include various components, which consume power during the process of receiving the signals. The transmitter may or may not transmit with multiple antennas, as will be described below.

At 404, a current (or first) level of performance of the receive paths is determined based on the signals received at 402 or information about the signals. This current level of performance may be based on various measures of performance, such as error rates, signal-to-noise ratios (SNRs), achievable data rates, or quality-of-service (QoS) for each of the receive paths 120-1, 120-2 based on signals received by antennas 202-1, 202-2. Based on any one or a combination of these rates, ratios, or qualities, controller 132 determines a current level of performance. In some cases, power is provided to previously un-powered components of receive paths to include these receive paths in the determination of the level of performance. For example, components associated with one or more antenna paths to which power was previously ceased or reduced may be re-powered at, or prior to, operation 404. In one embodiment, the current level of performance of each receive path is separately determined based on the signals received at 402 or information about the signals. In another embodiment, the current level of performance corresponding to a combination of all receive paths is determined based on the signals received at 402 or information about the signals.

By way of one example, assume that controller 132 of FIG. 2 determines a Signal-to-Interference plus Noise Ratio (SINR), represented mathematically as:

$$SINR = P/(I+N)$$

Here P is signal power, I is interference power, and N is noise power. The current level of performance of each of the receive paths 120-1, 120-2 is then determined to be each path's SINR as determined by controller 132.

At 406, a subset of the multiple receive paths is determined to meet or exceed a minimum reception performance metric based on the current level of performance of the multiple receive paths. Assume that controller 132 determines that a maximum achievable data rate for receive path 120-1 is sufficient to meet or exceed a minimum data rate metric. Further still, controller 132 may determine which of receive paths 120 (here receive path 120-1) has a highest data rate among receive paths 120 thereby determining a subset that meets a minimum data rate metric and also that has a highest data rate. In another embodiment, at 406, in addition to (or in lieu of) determining whether a subset of the multiple receive paths can meet or exceed a minimum reception performance metric, a determination can be made whether a subset of the multiple receive paths can maintain the current level of performance corresponding to the combination of all receive paths.

At 408, power is reduced or ceased to one or more components of the multiple receive paths other than those of the subset of the multiple receive paths. This may include ceasing to provide power to or reducing an amount of power provided to the one or more components. This may be effective to reduce an amount of power consumed by the receiver while meeting or exceeding the minimum reception performance metric and/or maintaining the current level of performance as previously determined across all receive paths. Continuing the ongoing example, controller 132 of FIG. 2 causes switch 134 to switch off power to receive path 120-2, which here includes antenna chain 122-2, RF chain 124-2, and baseband chain 126-2, and thus antenna 202-2, analog 204-2, de-precoder 206-2, demodulator 208-2, and decoder 210-2.

Alternatively or additionally, method 400 may proceed, either after block 404, 406, or 408 to block 410. At 410, a transmitting entity is caused to enable the subset of receive paths to meet or exceed the minimum reception performance metric and/or maintain the current level of performance as previously determined across all receive paths. Controller 132 can transmit information about the signals received sufficient to cause the transmitting entity (e.g., access point 118 of FIG. 1) to change transmission parameters. For example, controller 132 may transmit a supportable modulation and coding rate (MCS) or a multiple-in multiple-out (MIMO) scheme to access point 118. This may allow access point 118 to alter transmission to permit use of a subset of receive paths by receiver 114. Note also that method 400 may transmit information sufficient for transmitter 116 of access point 118 to reduce power consumption as well. This is addressed in greater detail below.

Optionally, method 400, in whole or in part, may be re-performed. Reception performance may change over time or due to some particular cause. To maintain the minimum reception performance or further reduce power consumption, method 400 may proceed, along the dashed line of FIG. 4, from block 408 to block 402. Method 400 may do so responsive to a time period elapsing, a power-consumption trigger, or a performance trigger. The time period may have a regular interval or an interval that varies with each repetition of method 400, such as a timer set by receiving device 102 at each iteration of method 400. This time period may be set in part based on an amount of power consumed to perform one or more operations of method 400. Thus, controller 132 may balance potential power savings by ceasing or reducing power provided to power one or more components of a receive path with power consumption of performing the method. If the potential savings are high and the cost to determine current levels of performance and the subset of receive paths at 404 and 406 are low, for example, the time period may be short. Conversely, if the potential savings are low, such as when one path only is being powered, controller 132 may adjust the time period to be rather long or set not based on saving power but instead based on appropriate time periods to meet or exceed a minimum reception performance metric.

Example performance triggers include an indication, whether internal or received from an entity external to controller 132, of a performance metric not being met or being easily met. A power consumption trigger may be an indication from receiving device 102 indicating that transmitter 116 is consuming too much power or that power consumption is no longer important, such as when receiving device 102 transitions from battery power to an external power source (AC or DC external power).

Assume, for example, that a time period elapses after which method 400 proceeds from block 408 to block 402. Assume also that the receiver includes four receive paths and that, during a first performance of method 400, controller 132 ceases to power two receive paths and maintains two other receive paths to receive signals. In such a case, the techniques may add a receive path (or two) to meet the minimum performance requirement and/or maintain the current level of performance as previously determined across all receive paths or, if power consumption is no longer a consideration, maximize performance without concern as to power consumption. Also in this case, one of the two receive paths being used may be powered down if controller 132 determines that only one of the two receive paths is needed to meet the minimum reception performance metric and/or maintain the current level of performance as previously determined across all receive paths. Thus, a more-current level of performance determined by repeating block 404 when the receiver is using the subset of the multiple receive paths, and again based on the minimum reception performance metric, may indicate that a smaller subset of the subset of the multiple receive paths will meet or exceed the minimum reception performance metric. Further, the determined more-current level of performance of the receiver may indicate that the metric is not being met and thus the techniques may re-power the receive paths to which power was previously reduced.

Figure 5:
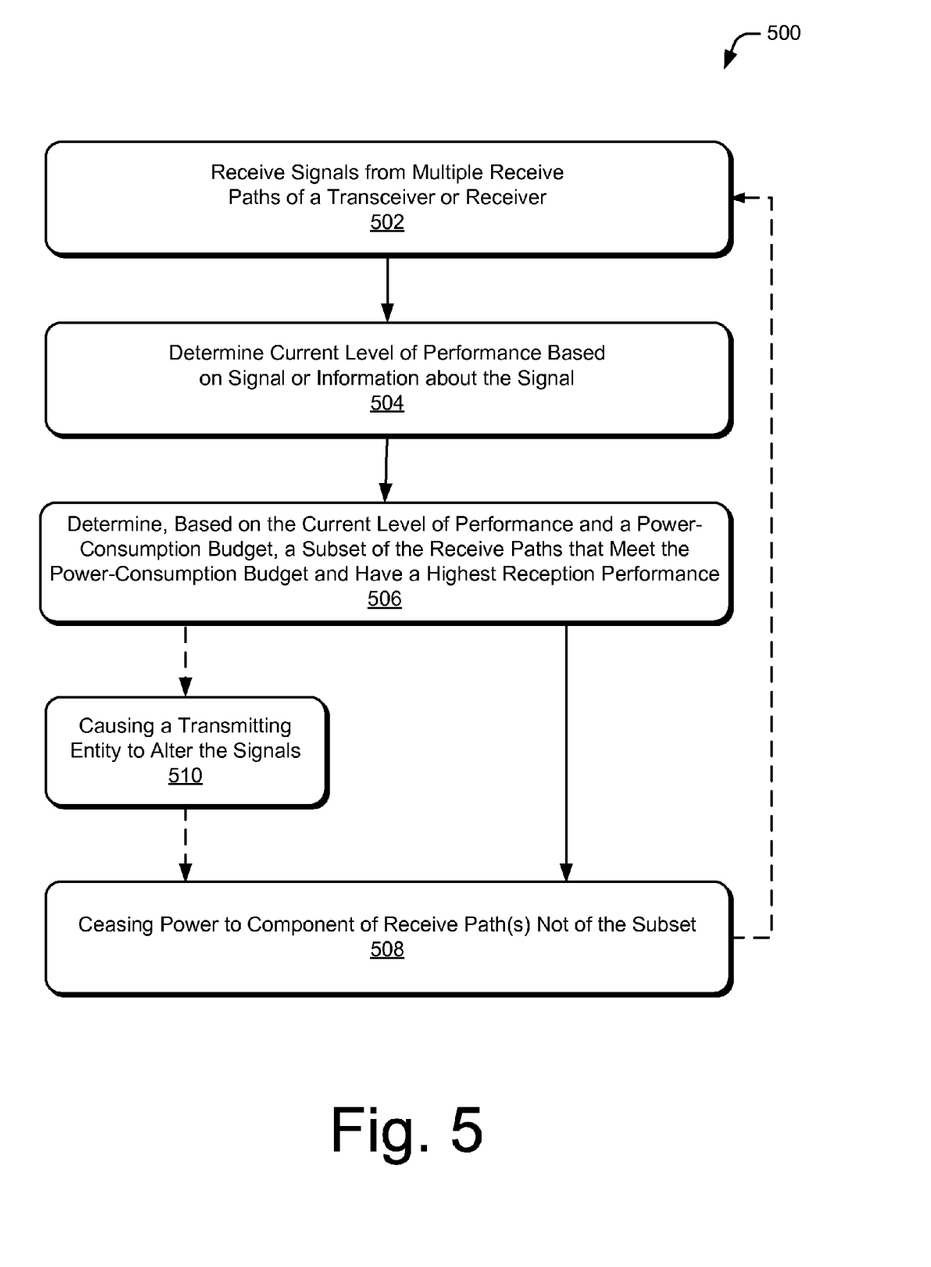
FIG. 5 illustrates a method for reducing power consumption of a multi-antenna receiver or transceiver, including maximizing performance at a power-consumption budget.

FIG. 5 illustrates a method 500 for reducing power consumption of a multi-antenna transceiver or receiver, including maximizing performance at a power-consumption budget. At 502, signals are received through receive paths of a receiver or transceiver, similarly as noted for method 400 and as illustrated in FIG. 2.

At 504, a current level of performance of each of the receive paths is determined based on the signals received at 502 or information about the signals. Manners in which to base a current level of performance for a receive path include an error rate, signal-to-noise ratio (SNR), achievable data rate, or quality-of-service (QoS). Assume, by way of example, that one of receive paths 120-1, 120-2 (here receive path 120-1) receives the signal at 502 and has a first error rate and that the other receive path 120-2 has a second, higher error rate. Thus, the current level of performance is higher for receive path 120-1 based on its lower error rate.

At 506, a subset of the multiple receive paths that will meet a power-consumption budget and have a highest current level of performance is determined based on the current levels of performance of the receive paths.

Continuing the present example, assume that controller 132 receives the power-consumption budget from receiving device 102, such as an operating system. Assume further that this power-consumption budget is determined based on receiving device 102 being on battery power and an amount of power available from the battery. At 506, controller 132 determines which of receive paths 120 of FIG. 2 have a higher performance. In some cases, however, there are three or more receive paths. In such a case, controller 132 determines not only which receive path has a highest reception performance, but, if two or more of the available receive paths can be used to meet the power-consumption budget, which of the receive paths, as a group, have a highest performance level. It is not necessary that the receive paths that each have highest levels of performance will necessarily be the receive paths that will have a highest aggregate level of performance when used together. In some cases, rather, the highest aggregate level of performance is instead achieved using a subset of the available receive paths that do not, individually, have highest levels of performance. This can be caused, for example, by noise and interference issues.

Further still, each receive path 120 may use different amounts of power. Two receive paths may share a same baseband chain 126, for example, while a third receive path has its own baseband chain 126. In such a case, controller 132 is capable of weighing different power usage, shared components, and how well receive paths perform operating together. In so doing, a highest reception performance overall can be met while meeting the power-consumption budget.

At 508, power is reduced or ceased to one or more components of the multiple receive paths other than those of the subset of the multiple receive paths. In some cases, power is reduced or ceased to components other than those of the subset of the multiple receive paths that are not shared with those of the subset of the multiple receive paths. This may be effective to reduce an amount of power consumed by the receiver while meeting or exceeding the minimum reception performance metric or power consumption budget. Continuing the ongoing example, controller 132 of FIG. 2 causes switch 134 to switch off power to receive path 120-2, which here includes antenna chain 122-2, RF chain 124-2, and baseband chain 126-2, and thus antenna 202-2, analog 204-2, de-precoder 206-2, demodulator 208-2, and decoder 210-2.

Similarly as noted for block 410 of method 400 of FIG. 4, method 500 may, alternatively or additionally, proceed to block 510 after block 504, 506, or 508. At 510, a transmitting entity is caused to alter the signals sufficient to enable the subset of receive paths to have the highest reception performance. Controller 132 can transmit information about the signals received sufficient to cause the transmitting entity (e.g., access point 118 of FIG. 1) to change transmission. For example, controller 132 may transmit a supportable modulation and coding rate (MCS) or a multiple-in multiple-out (MIMO) scheme to access point 118. Also similarly to method 400, method 500 may, in whole or in part, be re-performed responsive to triggers, an amount of time elapsing, and so forth.

Figure 6:
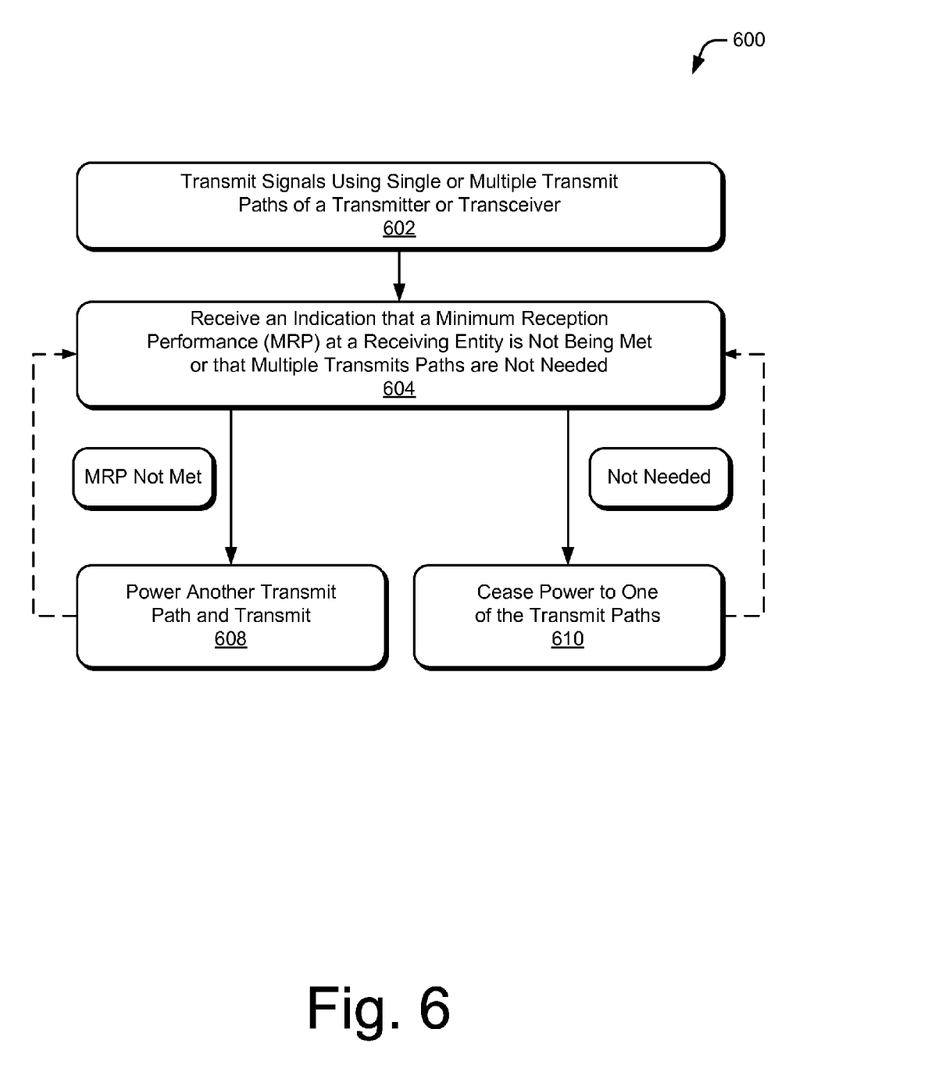
FIG. 6 illustrates a method for reducing power consumption of a multi-antenna transmitter or transceiver.

FIG. 6 illustrates a method 600 for reducing power consumption of a multi-antenna transmitter. At 602, signals are transmitted, to a receiving entity, using a single transmission path or multiple transmission paths of a transmitter of a transmitting entity. By way of example consider FIGS. 1 and 3, in which transmitter 116 of transmitting device 104 transmits signals through transmit paths 136 and using antennas 302.

At 604, an indication that a minimum reception performance metric is not being met or that multiple transmission paths are not needed is received from the receiving entity. Controller 132 of FIG. 3, for example, may receive, as the indication, a performance indicator for reception of the signals at the receiving entity. Controller 132 may then determine, based on the performance indicator, that transmission using the single transmission path or the multiple transmission paths is not sufficient to meet the minimum reception performance metric at the receiving entity. Assume for this example, that transmitting device 104 is a mobile, battery-powered access point. Assume also that one of multiple transmit paths are used at block 602. At 604, controller 132 receives the performance indicator from receiving device 102 indicating that a data rate is too low or that a SNR is too low. In response, controller 132 may add another transmit path, alter how the signal is being transmitted by the single transmit path, or increase power to one or additional transmit paths.

Note also that the indication may include information sufficient to permit transmitter 116 to improve reception performance at receiver 114, such as by receiving an MCS and MIMO scheme for transmission to the receiving entity, and then altering the transmission in accordance with the MCS or MIMO scheme. This can save power at the receiver and in some cases the transmitter as well. Consider a case where altering the transmission permits the receiver to meet a minimum reception performance with one less receive path while transmitting also with one less transmit path. In such a case both the receiver and transmitter reduce power consumption.

Method 600 proceeds to either block 608 or 610 based on the determination at block 604. Thus, responsive to receiving the indication that the minimum reception performance metric is not being met, method 600 proceeds along the "MRP Not Met" path to block 608. At 608, another transmission path is powered and transmission of signals begins. Here, transmitting the signals using the previously powered single transmission path or multiple transmission paths and this additional other transmission path may be effective to permit the receiving entity to meet its MRP metric. Method 600 may repeat blocks, such as periodically or responsive to a trigger, to maintain reception performance while reducing power consumption when reception performance is being met.

Thus, assume that method 600 is re-performed following block 608 in which another transmission path is powered and transmits. At a later point, a second indication is received at block 604 in which transmission of the signals using the transmission paths and the other transmission path is indicated as not needed to meet the minimum reception performance metric of the receiving entity. In response, method 600 proceeds to block 610 to cease to power one of the transmit paths or components thereof. A transmit path having a lowest transmission performance or highest power consumption may be selected for ceasing to power at block 610 if such information is known.

Alternatively or additionally, method 600 may receive information by which controller 132 of transmitter 116 may determine which transmit path has a lowest transmission performance. If such information is received, controller 132 may cease to power lower-performing transmit paths before higher-performing transmit paths, such as at block 610.

System-on-Chip

Figure 7:
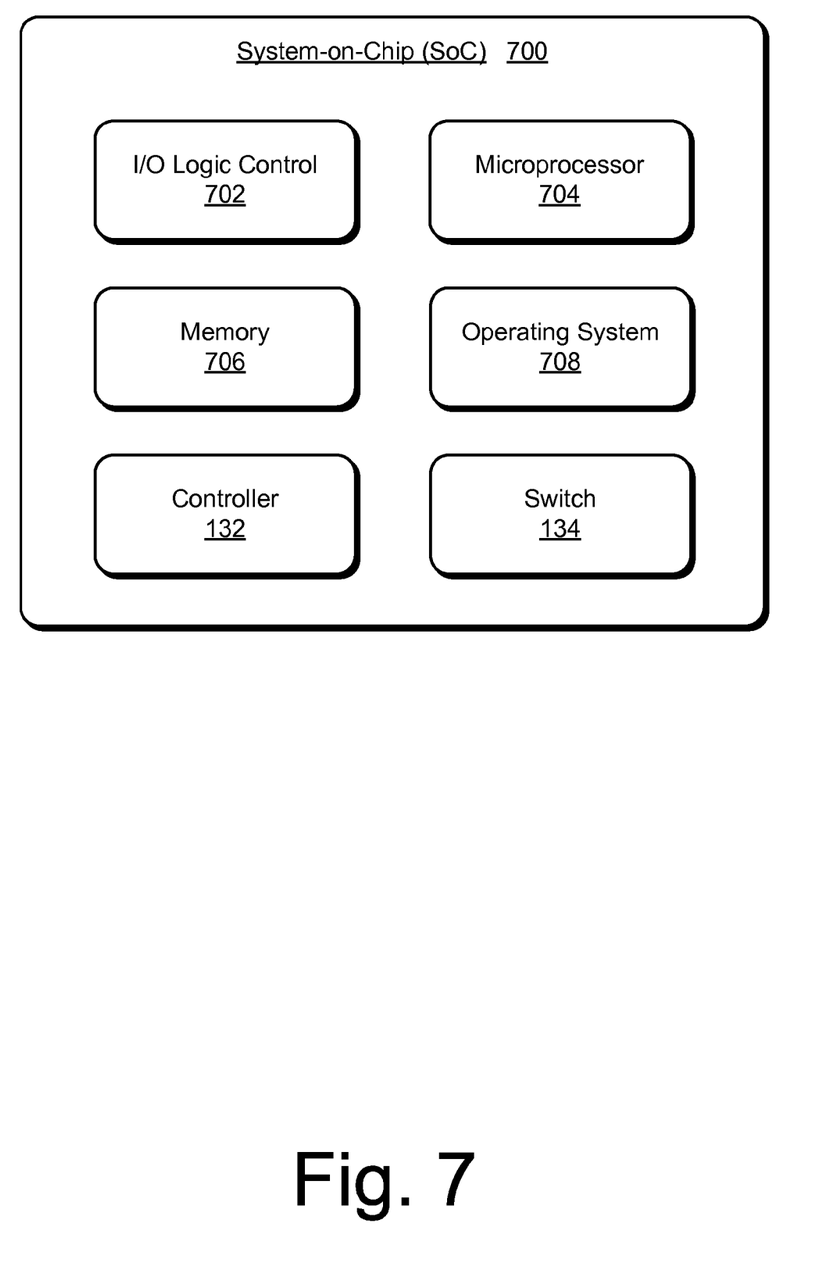
FIG. 7 illustrates a System-on-Chip (SoC) environment for implementing aspects of the techniques described herein.

FIG. 7 illustrates a System-on-Chip (SoC) 700, which can implement various aspects described above. A SoC can be implemented in any suitable device, such as a video game console, IP enabled television, desktop computer, laptop computer, tablet computer, smart-phone, server, network-enabled printer, set-top box, printer, scanner, camera, picture frame, mobile internet device, and/or any other type of device that may implement wireless connective technology. Although described as a System-on-Chip, entities described herein may be configured as any suitable type of system, such as a wireless device, a digital signal processor (DSP) and associated software, integrated-circuits (ICs), application-specific ICs (ASICs), and the like.

SoC 700 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 700 can also include an integrated data bus (not shown) that couples the various components of the SoC for data communication between the components. A wireless communication device that includes SoC 700 can also be implemented with many combinations of differing components. In some cases, these differing components may be configured to implement concepts described herein over a wireless connection or interface.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of RAM, low-latency nonvolatile memory (e.g., flash memory), ROM, and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, communication components, such as one or multiple receivers and transmitters (and components thereof) other hardware, firmware, and/or software.

SoC 700 includes controller 132 and switch 134, examples of which are described with reference to the respective components of the environment 100 shown in FIG. 1 and FIGS. 2 and/or 3. Controller 132 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which the structural features and/or methodological operations are presented and/or described.

What is claimed is:

1. A method for providing power to one or more of a plurality of components respectively associated with a plurality of receive paths of a receiver, the method comprising:
   determining a first level of performance associated with each receive path of the plurality of receive paths;
   determining, based on i) the first level of performance associated with each receive path of the plurality of receive paths and ii) a minimum reception performance metric, whether use of a subset of the plurality of receive paths will meet or exceed the minimum reception performance metric;
   in response to determining that the use of the subset of the plurality of receive paths will meet or exceed the minimum reception performance metric, ceasing to provide power to each component respectively associated with the plurality of receive paths other than the one or more of the plurality of components respectively associated with the subset of the plurality of receive paths; and
   in response to determining, based on a second level of performance of the subset of the plurality of receive paths and based on the minimum reception performance metric, that a smaller subset of the subset of the plurality of receive paths will meet or exceed the minimum reception performance metric, ceasing to provide power to each component respectively associated with the plurality of receive paths other than the one or more of the plurality of components respectively associated with the smaller subset of the subset of the plurality of receive paths; or
   in response to determining that the smaller subset of the subset of the plurality of receive paths will not meet the minimum reception performance metric, providing power to the components respectively associated with the subset of the plurality of receive paths.

2. The method of claim 1, wherein ceasing to provide the power to each component respectively associated with the plurality of receive paths other than the one or more of the plurality of components respectively associated with the subset of the plurality of receive paths comprises:
   ceasing to provide the power to one or more of a baseband chain, a radio frequency (RF) chain, or an antenna chain.

3. The method of claim 1, wherein the determining is performed responsive to a time period elapsing, a power-consumption trigger, or a performance trigger.

4. The method of claim 3, wherein the time period is determined based on a power consumption to perform the determining and a potential power savings associated with ceasing to provide the power to each of the components.

5. The method of claim 1, wherein the minimum reception performance metric includes, and the determining is based on, error rates, signal-to-noise ratios, achievable data rates, power consumption, or a quality of service for each of the plurality of receive paths.

6. The method of claim 1, further comprising, prior to the determining, providing power to one or more of the plurality of components to which the power is not being provided effective to include one or more receive paths associated with the previously un-powered components in the determining.

7. The method of claim 1, further comprising causing a transmitting entity from which signals are being received, and for which the first or second level of performance is determined, to permit the receiver to meet or exceed the minimum reception performance metric using the subset of the plurality of receive paths.

8. The method of claim 7, wherein causing the transmitting entity to permit the receiver to meet or exceed the minimum reception performance metric includes transmitting, to the transmitting entity, information about the signals.

9. The method of claim 7, wherein causing the transmitting entity to permit the receiver to meet or exceed the minimum reception performance metric includes transmitting, to the transmitting entity, a supportable modulation and coding rate (MCS) or a multiple-in multiple-out scheme (MIMO).

10. A system comprising:
    a receiver of a receiving entity operating at high power and having multiple receive paths, each of the receive paths having an antenna; and
    a controller configured to
       determine, based on a current level of performance of the receiver and a power-consumption budget, a subset of the multiple receive paths that will meet the power-consumption budget and have a highest reception performance, and
       cease power to the antennas of the multiple receive paths other than those of the subset of the multiple receive paths effective to meet the power-consumption budget.

11. The system of claim 10, wherein:
    each of the multiple receive paths has, or shares with another of the multiple receive paths, a radio-frequency (RF) chain and a baseband chain, and
    the controller is further configured to cease to power RF chains and baseband chains of the multiple receive paths other than those of the subset of the multiple receive paths that are not shared with those of the subset of the multiple receive paths.

12. The system of claim 10, wherein the controller is further configured to determine the subset that meets the power-consumption budget and has the highest level of performance by:
    causing a transmitting entity for which the current level of performance is determined to enable the subset to have the highest level of performance by altering transmission of the transmitting entity.

13. The system of claim 10, wherein the controller is further configured to receive the power-consumption budget, the power-consumption budget determined based on available power of a power source associated with a computing device in which the system is embodied.

14. A method comprising:
    transmitting, to a receiving entity, signals using a single transmission path or multiple transmission paths of a transmitter of a transmitting entity operating at high power;
    receiving, from the receiving entity, an indication that a minimum reception performance metric at the receiving entity is not being met or that the multiple transmission paths are not needed; and
    responsive to receiving the indication that the minimum reception performance metric is not being met, powering one or more additional transmission paths of the transmitter and transmitting, to the receiving entity, signals using the single transmission path or the multiple transmission paths and the one or more additional transmission paths; or
    responsive to receiving the indication that the multiple transmission paths are not needed, ceasing to power components of one or more of the multiple transmission paths.

15. The method of claim 14, wherein:
    the indication is a performance indicator for reception of the signals at the receiving entity; and the method further comprises determining, based on the performance indicator, that transmission using the single transmission path or the multiple transmission paths is not sufficient to meet the minimum reception performance metric at the receiving entity.

16. The method of claim 14, further comprising:
receiving, from the receiving entity, a supportable modulation and coding rate (MCS) or a multiple-in multiple-out (MIMO) scheme of transmission for transmission to the receiving entity; and
responsive to receiving the MCS or MIMO scheme, transmitting to the receiving entity in accordance with the MCS or MIMO scheme.

17. The method of claim 14, further comprising:
receiving, from the receiving entity, a second indication indicating that transmission of the signals using the single transmission path or the multiple transmission paths and the one or more additional transmission paths is not needed to meet the minimum reception performance metric; and
responsive to the second indication, ceasing to power a transmission path having a lowest transmission performance.

18. The method of claim 17, further comprising determining which of the transmission paths has the lowest transmission performance based on information received from the receiving entity.

* * * * *